2,980,341
ROTARY SPRINKLER SWIVEL WITH THRUST BEARING ASSEMBLY

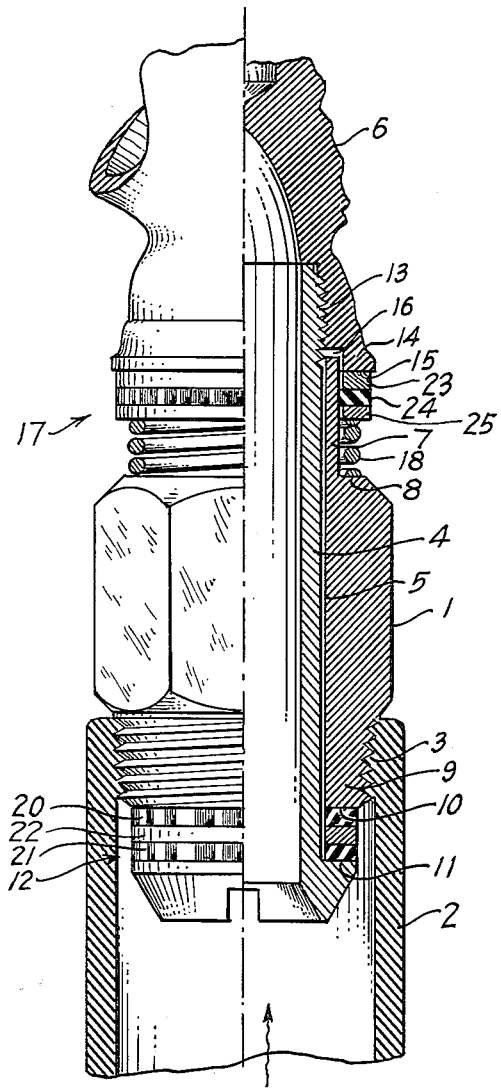

John A. Royer, William S. Kimbro, and Harry D. Jacoby, Fresno, Calif., assignors to Buckner Manufacturing Company, Inc., Fresno, Calif., a corporation of California Filed May 2, 1955, Ser. No. 505,338

3 Claims. (Cl. 239—261)

The present invention relates to improvements in a sprinkler bearing, and has particular reference to a sprinkler bearing in which a hollow spindle is revolvable in a bearing housing secured upon a riser and carries a sprinkler head which imparts rotary motion to the spindle when water is forced therethrough from below under pressure.

The principal object of our invention is to provide certain improvements in a sprinkler bearing of this type designed particularly to render the bearing leak-proof, and to prevent entry of water from the inside and dust or other impurities from the outside betwen the bearing faces.

A further object of the invention is to provide sealing means sufficiently resilient to yield to and recover from the "cock" of the spindle in the bearing housing due to the unbalanced condition inherent in the provision of a single large nozzle or two unbalanced nozzles projecting sidewise from the sprinkler head. The cocking of the spindle in the bearing housing is actually a rotary movement of nutation.

With spindle seal or spindle friction, washers of relatively hard material, this cocking action causes the washers to be unevenly compressed against the bearing housing, with the result that they are tightly compressed on one side with a tendency to open up on the opposite side.

In order to overcome this difficulty, it is proposed in the present invention to use soft rubber material which will give the extra compression necessary to the tight side, leaving enough compression still on the loose side to effect a proper seal.

Soft rubber, however, does not furnish a good bearing since it has a tendency to seize. It is further proposed, therefore, to provide washers of plastic material in conjunction with the soft rubber washers to provide the right amount of friction surface necessary for the perfect operation of a sprinkler with an intermittent drive.

During periods when sprinklers are not in operation, the absence of an upward hydraulic thrust would cause the spindle to drop in the bearing housing. In order to keep the spindle seal and friction washers under pressure against the housing at all times, it is proposed to provide a spring load exerting upward pressure on the spindle and the sealing assemblies.

Further objects and advantages of our invention will be apparent as the specification proceds, and the new and useful features of the invention will be fully defined in the claims attached hereto.

The preferred form of our invention is illustrated in the accompanying drawing which shows a side elevation of a sprinkler bearing, with one-half of the bearing shown in section.

While we have shown only the preferred form of our invention, it should be understood that various changes or modifications may be made within the scope of the claims hereto attached, without departing from the spirit of the invention.

Referring to the drawing in detail, the sprinkler bearing of the present invention comprises in its principal features, a bearing housing 1 adapted for securing upon a riser 2, as shown at 3, and a hollow spindle 4 mounted inside the bearing and having a revolving fit therewith, as shown at 5, the spindle having a sprinkler head 6 mounted upon the upper end thereof. It will be evident that the lower end of the spindle, as shown in the drawing, constitutes an inlet end for the spindle and the opposite end the outlet end which delivers water under pressure to the sprinkler head 6. The spindle has a substantially cylindrical external surface in spaced relation to a substantially cylindrical internal surface of the housing 1. This spacing permits the nutation of the spindle in the housing during rotation, as referred to previously.

It will be understood that the riser 2 connects with a source of water under pressure, such as a city water supply, and that the sprinkler head may be of any suitable well-known type constructed so as to rotate under the impact of the water discharged therethrough and to impart revolving motion to the spindle.

The water, passing through the spindle from below under pressure, exerts an upward thrust on the spindle, which normally ceases when the discharge of water is stopped.

The bearing housing 1 is of uniform inner diameter throughout the length thereof, is shaped polygonal through its middle portion for convenient handling by means of a wrench and has a reduced upper extension 7, which is in the form of a ring and forms a flat shoulder 8 with the main body portion.

The lower end 9 of the housing, which is threaded into the riser, terminates, within said riser, in a flat bottom or shoulder 10.

The spindle 4 is generally cylindrical in form and somewhat longer than the bearing housing. Its bottom end projects downwardly below the housing and terminates in a shoulder 11 disposed in confronting relation to the shoulder 10 of the housing, but spaced therefrom by the sealing assembly generally indicated at 12.

The upper end of the spindle projects above the upper end of the housing and is threaded, as at 13, to allow the sprinkler head 6 to be secured thereto.

The sprinkler head is formed with a descending apron 14, which is made to encircle the upper end of the extension 7 and presents a downwardly facing shoulder 15 arranged in confronting relation with the shoulder 8 of the housing.

The spindle is slidable in the housing, and a slight clearance is indicated at 16 to allow of a limited vertical play of the spindle in the housing.

A second sealing assembly 17, hereinafter referred to as the upper assembly, is provided between the shoulders 8 and 15, and is normally urged upward, under compression, by means of a spiral spring 18, which bears on the shoulder 8 and the lower portion of the upper sealing assembly.

It will be noted that during operation the water under pressure surrounds the lower sealing assembly 12 and exerts upward thrust on the spindle and the sprinkler head, thereby keeping the lower sealing assembly under compression. At the same time, the spring 18 keeps the upper sealing assembly under compression.

During idle periods, the spring 18, urging the upper sealing assembly against the head 6, causes the latter to exert a lifting effect on the spindle, which again places the lower sealing assembly under compression, and thus, both sealing assemblies are under pressure at all times.

The lower sealing assembly, which is principally intended to keep water from entering between the bearing faces of the spindle and the housing and to prevent the entry of impurities carried by the water, comprises a soft rubber washer 20 bearing against the shoulder 10, a second soft rubber washer 21 bearing against the shoulder 11, and a plastic friction washer 22 of the synthetic resin type interposed between the two soft rubber washers, the assembly being held under compression either by the pressure of the water, or by the spring 18.

The upper sealing assembly includes a friction washer 23, made of plastic material of the synthetic resin type and bearing against the shoulder 15, a soft rubber washer 24 bearing against the friction washer, and a metal washer 25 interposed between the soft rubber washer and the spring 18 to serve as a bearing for the latter.

The soft rubber washer 24 is made so that in its free state, the diameter of its opening is somewhat smaller than the outer diameter of the extension 7, so that it has to be stretched to engage over the extension and forms a seal therewith. This seal is tight enough to prevent passage of dirt and water between the washer and the bearing housing, but not so tight that it cannot bear against the head friction washer. The latter, in turn, bears against the sprinkler head, forming a sealing as well as a friction surface against which the sprinkler head rotates.

This combination of washers and bearing and spring at the top of the sprinkler bearing assembly provides a seal which prevents blown sand, dirt and silt from passing to the top of the spindle, and from being washed down between the bearing housing and the spindle during sprinkling operations.

In agricultural sprinkling systems where sprinklers must be moved from place to place in wind and under other similar unfavorable conditions, this sealing against the entrance of dirt at the top of the spindle is most important.

Likewise, in agricultural sprinkler systems, where water is pumped from canals, rivers, lakes, and other sources having a high silt content, the sealing at the bottom of the spindle is important.

While the housing 1 is here shown with a male thread at 3 for screwing into the riser, it would be perfectly feasible to extend the housing below the bottom end of the spindle and forming it with a female thread for screwing on the riser, still leaving the space around the sealing assembly, to cause the latter to be submerged in the water under pressure.

We claim:

1. In a sprinkler assembly, an elongated tubular bearing housing adapted for connection at its lower end to a water supply riser, a hollow spindle journaled for rotation within said housing, said spindle having upper and lower end portions projecting beyond respective ends of said housing, the lower end of said spindle terminating in an enlarged shoulder presenting a flat, annular and upwardly facing thrust surface and the lower end of said housing presenting a flat, annular and downwardly facing thrust surface, combined bearing and sealing means sandwiched between said thrust surfaces and constituting the sole means for limiting axial upward movement of said spindle with respect to said housing, a hollow discharge member secured to the upper end portion of said spindle and rotatable in response to the flow of water outwardly therethrough, said discharge member being spaced from the upper end portion of said housing to permit limited relative sliding movement between the housing and the spindle, said rotary discharge member being of the type providing resistance to discharge of water therethrough so that water under pressure passing upwardly through said spindle will impart a lifting force upon said spindle to compress said combined bearing and sealing means and maintain the same in sealing relation with said thrust surfaces, said combined sealing and bearing means including a pair of stacked and sealingly interengaged annular washers surrounding said spindle and effecting a seal between said thrust surfaces, said washers being of rectangular cross section and of substantially the same outer diameter, one of said washers being of soft rubber material and the other washer being of hard plastic material, resilient means interposed between and bearing upon said housing and said discharge member normally to effect a seal between said washers in the absence of water under pressure in said riser, a seal between the upper end of said housing and said discharge member to prevent the entry of foreign material from outside the housing between the housing and spindle, said discharge member terminating at its lower end in a downwardly facing shoulder and said housing having an upwardly facing shoulder disposed in spaced relation thereto, said last mentioned seal including a plastic washer surrounding the upper end portion of said housing and sealingly engaging said downwardly facing shoulder on said discharge member, and a resilient rubber washer engaging the undersurface of the last mentioned plastic washer and sealingly embracing the upper end portion of said housing, said resilient means being seated upon said upwardly facing shoulder on the housing and bearing against the undersurface of the last mentioned rubber washer to maintain the same in sealed relation with the last mentioned plastic washer.

2. In a sprinkler assembly, an elongate tubular bearing housing adapted for connection at its lower end to a water supply riser, a hollow spindle journaled for rotation within said housing, said spindle having upper and lower end portions projecting beyond respective ends of said housing, the lower end of said spindle terminating in an enlarged shoulder presenting a flat, annular and upwardly facing thrust surface and the lower end of said housing presenting a flat, annular and downwardly facing thrust surface, combined bearing and sealing means sandwiched between said thrust surfaces and constituting the sole means for limiting axial upward movement of said spindle with respect to said housing, a hollow discharge member secured to the upper end portion of said spindle and rotatable in response to the flow of water outwardly therethrough, said discharge member being spaced from the upper end portion of said housing to permit limited relative sliding movement between the housing and the spindle, said rotary discharge member being of the type having resistance to passage of water therethrough so that water under pressure passing upwardly through said spindle from the riser and forced outwardly of the discharge member will impart a lifting force upon said spindle to compress said combined bearing and sealing means and maintain the same in sealing relation with said thrust surfaces, said combined sealing and bearing means including a pair of stacked and sealingly interengaged annular washers surrounding said spindle and effecting a seal between said thrust surfaces, said washers being of rectangular cross section and of substantially the same outer diameter, one of said washers being of soft rubber material and the other washer being of hard plastic material, said discharge member being recessed at its lower end and receiving the upper end of said housing and presenting a downwardly facing thrust shoulder surrounding such recess, said housing having an upwardly facing thrust shoulder disposed in spaced relation to the thrust shoulder on said discharge member, and an upper seal assembly embracing the upper portion of said housing and engaging the thrust shoulder of said discharge member, said upper sealing assembly including a plastic washer engaging said thrust shoulder of the discharge member, a resilient rubber washer sealingly embracing the upper portion of said housing and sealingly engaged against the undersurface of the plastic washer and a spring seated upon the thrust shoulder of said housing and bearing upon the undersurface of the rubber washer to urge the same upwardly against the plastic washer to maintain the latter in sealed engagement with the thrust shoulder of said discharge member and simultaneously urge the spindle upwardly with respect to the housing to normally effect a seal between the washers of the said combined sealing and bearing means in the absence of water under pressure in said riser.

3. In a sprinkler assembly, an elongated tubular bearing housing having one end adapted for connection to a source of water under pressure and an oppositely extended end; a hollow spindle journaled for rotation within the housing, the spindle having intake and outlet end portions projecting beyond the connection and extended ends of the housing respectively, the intake end of the spindle terminating in an enlarged shoulder presenting an annular thrust surface disposed toward the housing and the connection end of the housing providing an annular thrust surface disposed toward the thrust surface of the shoulder of the spindle, the spindle having a substantially cylindrical external bearing surface and the housing having a substantially cylindrical inwardly disposed bearing surface in adjacent spaced relation to the bearing surface of the spindle whereby nutatory rotation of the spindle in the housing is permitted; first combined bearing and sealing means positioned between said thrust surfaces and limiting axial movement of the spindle with respect to the housing in the direction of the extended end of the housing; a hollow discharge member secured to the discharge end portion of the spindle and rotatable in response to the flow of water outwardly therethrough, said discharge member being spaced from the extended end of said housing to permit limited relative sliding movement between the spindle and the housing, said discharge member providing a restricted discharge passage whereby projection of water from the housing therethrough draws the spindle axially in the direction of the extended end of the housing to compress the combined bearing and sealing means and maintain the same in sealing relation between the thrust surfaces, said first combined sealing and bearing means including a pair of stacked and sealingly inter-engaged annular washers surrounding the spindle, one of said washers being of soft rubber material and another washer being of hard plastic material and engaged against the one washer, said discharge member providing a circumscribing thrust shoulder disposed toward the housing, said housing providing a circumscribing shoulder disposed toward the discharge member; and a second bearing and sealing assembly embracing a portion of the housing adjacent to the discharge member and engaging the shoulder of the housing, said second assembly including a washer of hard plastic material rotatable against the shoulder of the discharge member, a resilient washer of soft rubber sealingly embracing the housing and sealingly engaged against the plastic washer, and a compression spring seated upon the shoulder of the housing and bearing against the rubber washer to urge the same against the plastic washer to maintain the latter in sealed engagement with the shoulder of the discharge member and simultaneously urging the spindle axially in the direction of its discharge portion normally to effect a seal between the washers of said combined sealing and bearing means in the absence of water under pressure in the housing, the rubber washers in the first and second bearing and sealing assemblies being sufficiently axially compressible to accommodate nutation of the spindle in the housing during rotation to the extent that such nutation is permitted between spaced bearing surfaces of said spindle and housing.

References Cited in the file of this patent

UNITED STATES PATENTS

| | | |
|---|---|---|
| 671,366 | Brodie | Apr. 2, 1901 |
| 681,067 | Morrissey | Aug. 20, 1901 |
| 988,423 | Wittekopf | Apr. 4, 1911 |
| 1,845,364 | Thompson | Feb. 16, 1932 |
| 2,064,066 | Jepson | Feb. 15, 1936 |
| 2,086,515 | Evans | July 6, 1937 |
| 2,323,701 | Barksdale | July 6, 1943 |
| 2,352,343 | Reynolds | June 27, 1944 |
| 2,499,659 | Lockwood | Mar. 7, 1950 |
| 2,570,406 | Troshkin et al. | Oct. 9, 1951 |
| 2,582,158 | Porter | Jan. 8, 1952 |
| 2,586,517 | Coles | Feb. 19, 1952 |
| 2,587,170 | Klingler | Feb. 26, 1952 |
| 2,625,411 | Unger | Jan. 13, 1953 |
| 2,683,056 | Hilfinger | July 6, 1954 |
| 2,712,457 | Kimbro | July 5, 1955 |
| 2,769,666 | Spender | Nov. 6, 1956 |
| 2,792,256 | Sinex | May 14, 1957 |